(12) United States Patent
Hsiao et al.

(10) Patent No.: US 11,011,935 B2
(45) Date of Patent: May 18, 2021

(54) SMART WIRELESS POWER/DATA TRANSFER SYSTEM

(71) Applicant: SWR Technology Inc, Fremont, CA (US)

(72) Inventors: Wenching Hsiao, Zhubei (TW); Shengming Shan, Fremont, CA (US)

(73) Assignee: SWR Technology Inc., Fremont, CA (US)

( * ) Notice: Subject to any disclaimer, the term of this patent is extended or adjusted under 35 U.S.C. 154(b) by 31 days.

(21) Appl. No.: 16/385,949

(22) Filed: Apr. 16, 2019

(65) Prior Publication Data

US 2020/0220386 A1    Jul. 9, 2020

Related U.S. Application Data

(60) Provisional application No. 62/788,194, filed on Jan. 4, 2019.

(51) Int. Cl.
| | |
|---|---|
| *H02M 7/5387* | (2007.01) |
| *B60L 53/12* | (2019.01) |
| *H02J 50/12* | (2016.01) |
| *H02J 50/90* | (2016.01) |
| *H02J 50/60* | (2016.01) |
| *H02J 50/80* | (2016.01) |

(52) U.S. Cl.
CPC ............. *H02J 50/12* (2016.02); *H02J 50/60* (2016.02); *H02J 50/80* (2016.02); *H02J 50/90* (2016.02)

(58) Field of Classification Search
CPC .................................. H02J 50/12; H02J 7/025
See application file for complete search history.

(56) References Cited

U.S. PATENT DOCUMENTS

| | | | | |
|---|---|---|---|---|
| 9,306,635 | B2* | 4/2016 | Kurs ...................... | H02J 7/025 |
| 9,476,736 | B2* | 10/2016 | Arisawa ................. | H02J 7/025 |
| 9,660,536 | B2* | 5/2017 | Hosotani ............ | H02M 3/33507 |
| 2010/0052431 | A1* | 3/2010 | Mita ....................... | H02J 50/12 |
| | | | | 307/104 |
| 2014/0285027 | A1* | 9/2014 | Sakamoto ............... | B60L 53/63 |
| | | | | 307/104 |
| 2017/0194817 | A1* | 7/2017 | Takatsu ................... | H02J 50/12 |
| 2017/0346346 | A1* | 11/2017 | Shimokawa ............ | H03L 7/085 |
| 2018/0342878 | A1* | 11/2018 | Nagaoka ................. | B60L 50/60 |
| 2019/0115656 | A1* | 4/2019 | Fukumoto ............... | H02J 50/90 |
| 2019/0199135 | A1* | 6/2019 | Nagaoka ............. | H02M 7/5387 |

\* cited by examiner

*Primary Examiner* — Jared Fureman
*Assistant Examiner* — Esayas G Yeshaw
(74) *Attorney, Agent, or Firm* — Wang Law Firm, Inc.

(57) ABSTRACT

A system for providing electrical power to a remote device through wireless transmission and the system comprises a power transmitting data unit (PTDU) receiving electrical power from a power source and at least one power receiving data unit (PRDU), connected to the remote device, receiving electromagnetic waves and converting the electromagnetic waves to the electrical power. The PTDU further comprises a controller, a first resonator emitting electromagnetic waves, and a DC/AC converter receiving electrical power from a remote power source and providing a driving voltage at a driving frequency to the first resonator, the driving frequency being independent from a resonant frequency of the first resonator, and the controller monitors environment variables related to the emitting of electromagnetic waves.

20 Claims, 8 Drawing Sheets

SMART WIRELESS POWER/DATA TRANSFER SYSTEM

RELATED APPLICATION

This application is a non-provisional application of U.S. Provisional Patent Application 62/788,194, filed on Jan. 4, 2019, the specifications of which is included in their entireties by this reference.

FIELD OF THE INVENTION

The present invention generally relates to electrical power delivery, and more specifically to a wireless power delivery system.

BACKGROUND OF THE INVENTION

Traditionally electrical power is delivered by connecting physically a device to an electrical grid and in recent years new system has been developed to deliver electrical power through electromagnetic induction. For wireless power transfer, non-radiative technique is generally used and the power is transferred over short distances by magnetic fields through inductive coupling or electric field through capacitive coupling. The transmission of electrical power through electromagnetic induction involves two devices, one is an electromagnetic wave transmitter and other is an electromagnetic wave receiver. The electrical power is transmitted by the electromagnetic wave transmitter as electromagnetic wave through the air or through other medium and received and converted back to the electrical power by the electromagnetic wave receiver. Each of the transmitter and the receiver includes a resonator operating at a certain frequency. The effective transmission of the power requires the frequencies used in the resonator in the transmitter and the resonator in the receiver to be the same or within a narrow band of each other.

This requirement of the operating frequencies to be the same or within a narrow band places a limitation on the wireless power transfer. Hence, it is imperative to devise a system that improves the wireless power transfer.

SUMMARY OF THE INVENTION

In one embodiment, the invention is a system for providing electrical power to a remote device through wireless transmission and the system comprises a power transmitting data unit (PTDU) receiving electrical power from a power source and at least one power receiving data unit (PRDU), connected to the remote device, receiving electromagnetic waves and converting the electromagnetic waves to the electrical power. The PTDU further comprises a controller, a first resonator emitting electromagnetic waves, and a DC/AC converter receiving electrical power from a power source and providing a driving voltage at a driving frequency to the first resonator, the driving frequency being independent from a resonant frequency of the first resonator, and the controller monitors environment variables related to the emitting of electromagnetic waves.

In another embodiment, the present invention is a method for transferring electrical power wirelessly to a remote device through electromagnetic waves. The method comprises emitting a power beacon by a power transmitting data unit (PTDU), receiving, by the PTDU, an information from at least one power receiving data unit (PRDU), retrieving, by the PTDU, a profile for the at least one PRDU based on the information received, determining, by the PTDU, a driving voltage and a driving frequency according to environment variables, and emitting, by the PTDU, electromagnetic waves according to the driving voltage and the driving frequency. The driving frequency is independent from resonant frequencies for the PTDU and the at least one PRDU.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

In essence, the present invention is a high efficiency smart wireless power/data transfer system that has a high tolerance for resonator frequency variation, load variation, distance variation. The present invention also introduces methods for aiding physical alignment between a transmitter and a receiver and for detecting foreign objects in a setting for power transfer. The present invention enables cost effective implementation of a highly scalable and efficient wireless power/data transfer system. Through continuous data exchange with targeted devices and creation of a profile for each device, the system according to the present invention can tailor each wireless power transfer according to the characteristics of the devices and also the physical environment.

Figure 1:
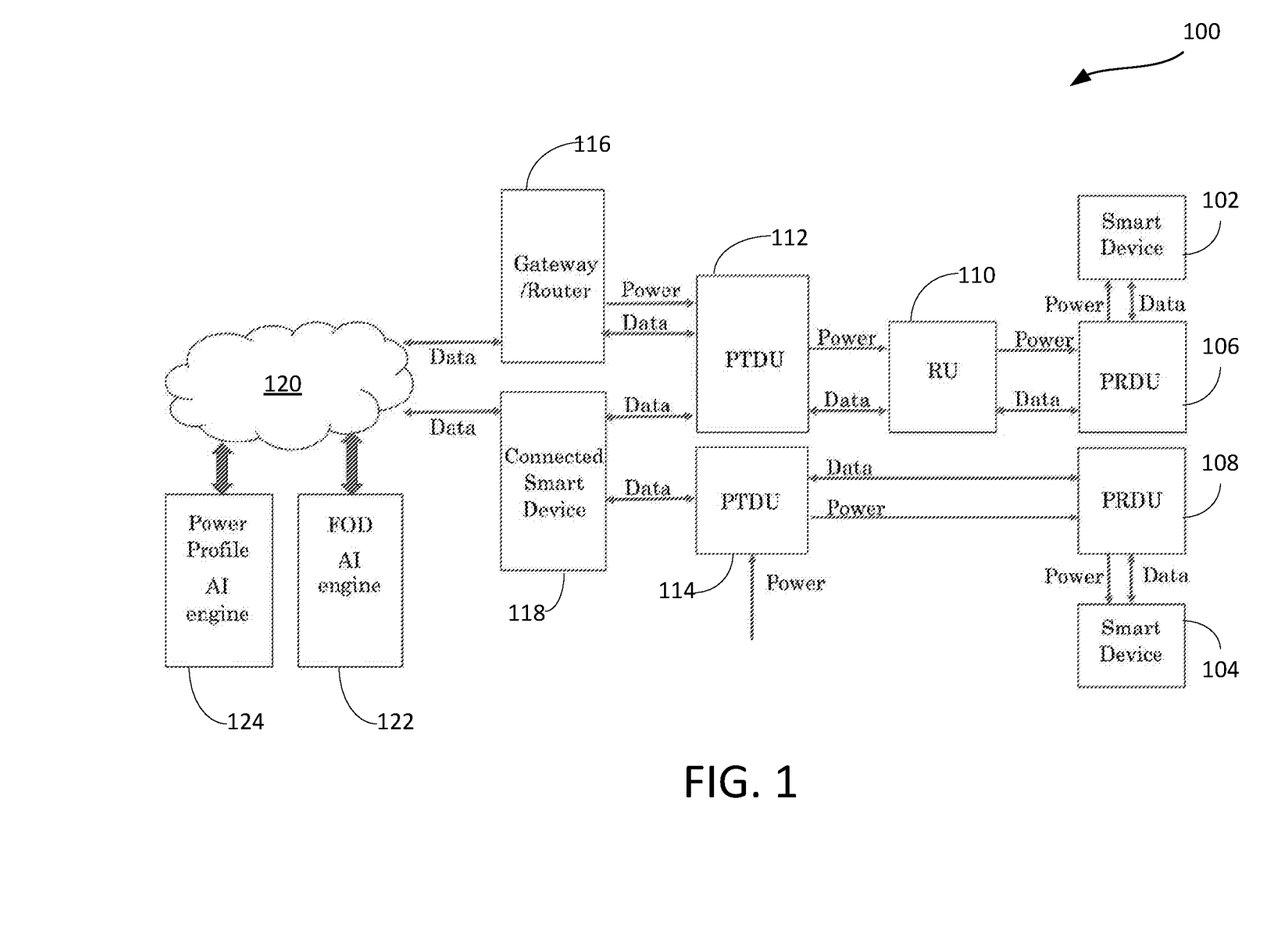
FIG. 1 is architecture 100 of a system according to the invention.

FIG. 1 shows architecture 100 of a system to transfer power wirelessly according to the present invention. The electrical power is transferred wirelessly from a power source (not shown) connected to a Power Transmitting Data Unit (PTDU), 112, 114 to a Power Receiving Data Unit (PRDU) 106, 108 to which devices 102, 104 are connected. For portable devices, such as smart phones, the PRDU 106, 108 may be built into the smart phones. For devices, such as home appliances or factory machineries, the PRDU 106, 108 may be separated from the devices and the power may be transmitted through a wire or a cable from the PRDU 106, 108 to the home appliances.

Besides transferring the power to the devices 102, 104, the data can also be exchanged through a data link between the devices 102, 104 and the PRDU 106, 108. The data from the devices 102, 104 may be the identification data from the devices 102, 104. The data may also be coming from the PRDU 106, 108 and this data represent the status of wireless transfer (current/voltage drawn by the devices 102, 104) from the PRDU 106, 108. The PRDU 106, 108 sends and receives data from the PTDU 112, 114. The data link between the PRDU 106, 108 and the PTDU 112, 114 is through wireless communication. One example of such wireless communication is through the ISM band (industrial, scientific, and medical radio band) and the data is transferred through out-of-band communication. It is understood that other communication protocol may also be used for the communication between the PTDU and the PRDU. When a PTDU is located far away from a PRDU, for the wireless power transfer to work properly, a Repeater Unite (RU) 110 may be used. The RU 110 receives the power from the PTDU 112 and transmits to the PRDU 106. The RU 110 also supports two way communication and relays the data between the PTDU 112 and the PRDU 106. It is understood that other wireless communication means may also be used to support the data link between the PTDU and PRDU.

The data link between the PRDU 106, 108 and the PTDU 112, 114 also enables the device 102, 104 to send and receive data to and from the Internet 120. While the device 102, 104 is connected to the PTDU 112, 114 through the PRDU 106, 108, an application running on the device can reach the Internet through the data link between the PTDU and PRDU to a server on the Internet 120.

The data from the device 102, 104 may be identification data that is exchanged between the device 102, 104 and the PTDU 112, 114 when the device 102, 104 is first connected to the system. The PTDU 112, 114 will retrieve a profile associated with the device 102, 104 and the profile may contain set up information for the device 102, 104 and the associated PRDU 106, 108 and PTDU 112, 114. The PTDU 112, 114 may also create a profile for the device 102, 104 if there is no profile found for the device 102, 104. The data received from the PRDU 106, 108 during the power transfer may contain status information related to the power transfer and the PTDU 112, 114 continuously monitor these data. The profile may contain the identification data for a device, the set up information for the PRDU, and the past power transfer information. The identification data may be collected from the device and may be used for setting up the device, while the power transfer information may be received from the PRDU. Through continuous monitoring of these data, the PTDU 112, 114 may detect problems at the device 102, 104 and may adjust the driving parameters of the PTDU 112, 114.

The data (except the user data from the applications running on the devices) received from the device 102, 104 are saved in a profile. The profile for each device may be stored in a local server or a remote server 124. The remote server 124 may serve as an artificial intelligence (AI) engine that processes the data (except the user data) received from the devices 102, 104 and the PRDU 106, 108. The connection from the PTDU 112, 114 to the remote server 124 may be through a gateway/router 116 and the Internet 120. Alternatively, the PTDU 112, 114 may be connected to the remote server 124 through a smart device 118 and the Internet 120.

By receiving the data from the devices 102, 104 and from the PRDU 106, 108, and the environment variables sensed by the PTDU, 112, 114, the system of the present invention will be able to detect foreign objects that may be present in the environment. Foreign objects refer to metallic objects that may be heated when exposed in an electromagnetic field, thus reducing the efficiency of power transfer and creating a dangerous situation. The recognition of the foreign objects can be done through an AI engine 122 by processing the data received from either the devices 102, 104, from the PRDU 106, 108, or the environment variables sensed by the PTDU 112, 114. The recognition of the foreign objects improves over time as more data are received from the PRDU 106, 108 and the devices 102, 104.

Figure 2:
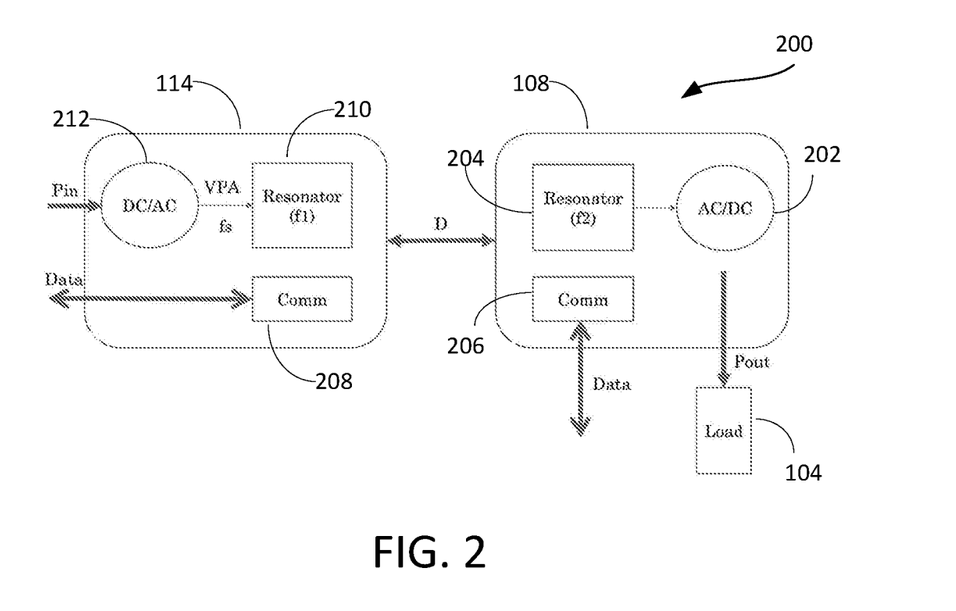
FIG. 2 is an illustration 200 of the interface between a PTDU and a PRDU.

FIG. 2 is an illustration 200 of interface between a PTDU 114 and a PRDU 108. The PRDU 108 receives electrical power through electromagnetic waves from the PTDU 114 and supplies the electrical power to a device 104. The PRDU 108 has a resonator 204, an AC/DC power converter 202, a controller (not shown), and a communication unit 206. The resonator 204 receives and converts the electromagnetic waves into alternate current (AC) and this AC is converted to a direct current (DC) by the AC/DC converter 202. The DC is then made available to the device 104. The DC may be used directly by the device 104 or may be used to charge a storage unit inside the device 104. The communication unit 206 sends and receives data to and from the device 104. The communication unit 206 also send the data received from the device 104 to the PTDU 114 and the data is sent wirelessly to the PTDU 114 as out of band communication.

The PTDU 114 receives electrical power from a power source and transmits the power through electromagnetic waves to the PRDU 108. The PTDU 114 has a resonator 210, a DC/AC power converter 212, a controller (not shown), and a communication unit 208. The DC/AC power converter 212 converts the DC to AC that drives the resonator 210. The PTDU 114 also may receive the AC directly. The resonator 210 receives the AC and generates electromagnetic waves. The communication unit 208 receives the data transmitted wirelessly by the PRDU 108. The data exchanged between the PTDU 114 and the PRDU 108 are basically two types: power control information and user data. The PTDU 114 sends the power control data to the PRDU 108, so the PRDU 108 can be properly set up for the power transfer. The PRDU 108 sends the status information back to the PTDU 114. The user data being from the applications running on the device 104 are sent from the PRDU 108, through the PTDU 114, to servers connected to the Internet.

The resonators 204 in the PRDU 108 has a resonant frequency $f2$ and the resonator 210 in the PTDU 114 has a resonant frequency $f1$. The resonant frequency $f1$ may be different from the resonant frequency $f2$. The resonator 210 in the PTDU 114 is driven by a voltage VPA from the DC/AC power converter 212 operating at frequency $fs$. The PTDU 114 can determine a best operating frequency $fs$ for the DC/AC power converter 212, such that there is no relationship between the frequencies $f1$ and $f2$, the frequency $fs$ is independent from frequency $f1$, and the frequency $fs$ is larger than frequency $f2$.

Traditionally the power transfer between the PTDU 114 and the PRDU 108 is through resonant inductive coupling, where the resonators in the PTDU 114 and the PRDU 108 are tuned to resonate at a resonant frequency and the resonant frequency is the same as or close to the resonant frequency of each PTDU and PRDU. The smart algorithm, introduced by the present invention, running on the PTDU 114 can find the best operating frequency $fs$, along with proper adjustment of the driving voltage VPA and the driving frequency to deliver the power with good system efficiency and there is no requirement for the operating frequency (also known as driving frequency) $fs$ to be close to or the same as the resonant frequencies $f1$ and $f2$. The operating frequency fs is independent of the resonant frequency f1 and also larger than the resonant frequency f2. This algorithm can handle dynamic load change and distance change by adjusting operating frequency fs and/or driving voltage VPA.

Figure 3:
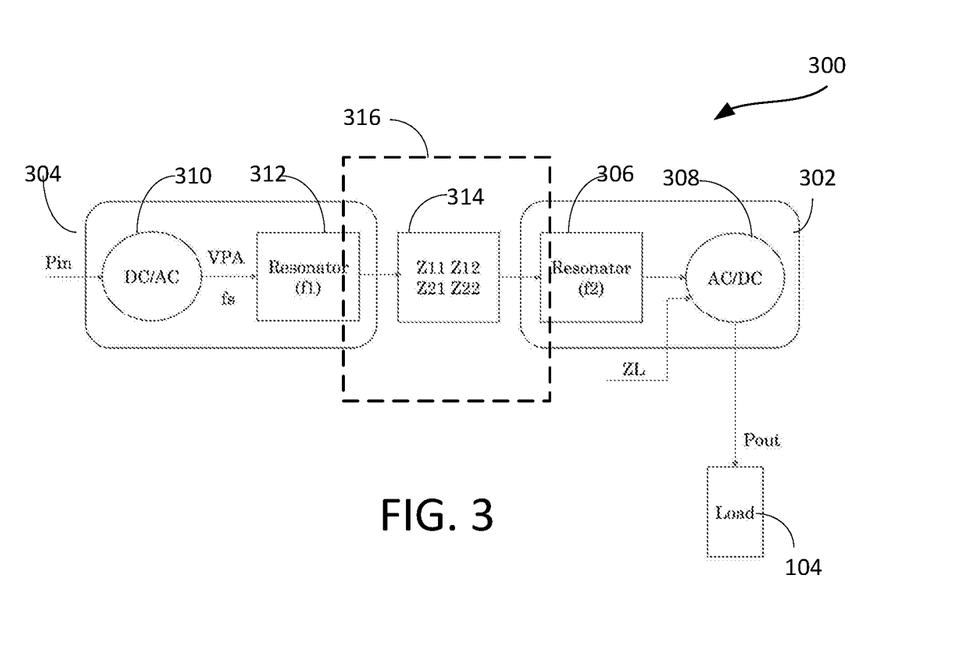
FIG. 3 is another embodiment 300 of the interface between a PTDU and a PRDU.

FIG. 3 is another embodiment 300 of the interface between a PTDU and a PRDU and also a simple schematic representation of wireless power transfer between two ports. The communication units in both the PTDU 304 and the PRDU 302 are omitted for simplicity, however, the data exchange exists between the PTDU 304 and the PRDU 302. The components within the PTDU 304 and within the PRDU 302 functions as previously described. The RU 314 is employed when the PRDU 302 is physically located at a greater distance from the PTDU 304.

With or without the RU 314, the efficiency of the power transfer between the PTDU 304 and the PRDU 302 depends on the impedances of a transmitting port (Port 1) and a receiving port (Port 2), and the transfer impedance. The transfer between the PTDU 304 and the PRDU 302, as represented by box 316, and the impedances can be expressed as follows.

$$Z_{11} = R_{11} + jX_{11}$$

$$Z_{12} = R_{12} + jX_{12}$$

$$Z_{21} = R_{21} + jX_{21}$$

$$Z_{22} = R_{22} + jX_{22}$$

wherein
Z=R+jX means Impedance (Z)=Resistance (R)+j*Reactance (X).
$Z_{11}$=Impedance seen at Port 1, $Z_{12}$=transfer impedance from Port 2 to Port 1;
$Z_{22}$=Impedance seen at Port 2, $Z_{21}$=transfer impedance from Port 1 to Port 2;
$R_{11}$=Resistance seen at Port 1, $R_{12}$=transfer Resistance from Port 2 to Port 1;
$R_{22}$=Resistance seen at Port 2, $R_{21}$=transfer Resistance from Port 1 to Port 2;
$X_{11}$=Reactance seen at Port 1, $X_{12}$=transfer Reactance from Port 2 to Port 1;
$X_{22}$=Reactance seen at Port 2, $X_{21}$=transfer Reactance from Port 1 to Port 2;

The Z matrix above is a general 2 port model and can represent any system. In a general context, it represents PTDU resonator and PRDU resonators and everything between them. Thus, it could mean any circuitry, mechanical housing, air, wood, glass sitting, and other medium between PTDU resonator and PRDU resonator. The $R_{ij}$, $Z_{ij}$, and $X_{ij}$ represent part of the resonators PTDU and PRDU and everything between them.

From the above, the efficiency can be expressed as follows.

$$Eff = \frac{(RL.R_{12}^2 + RL.X_{12}^2)}{\begin{array}{c}(-R_{22} - RL).R_{12}^2 + (2.X_{12}.X_{22} - \\ 2.X_{12}.XL).R_{12} + R_{11}.R_{22}^2 + 2.R_{11}.R_{22}.RL + \\ R_{22}.X_{12}^2 + R_{11}.RL^2 + RL.X_{12}^2 + \\ R_{11}.X_{22}^2 + 2.R_{11}.X_{22}.XL + R_{11}.XL^2\end{array}}$$ [Equation 1]

RL=load resistance;
XL=load reactance;
For a lossless coupling when $R_{12}=0$, the efficiency is as follows.

$$Eff_{0R12} = \frac{RL.X_{12}^2}{\begin{array}{c}R_{11}.R_{22}^2 + R_{11}.RL^2 + R_{11}.X_{22}^2 + R_{22}.X_{12}^2 + \\ R_{11}.XL^2 + RL.X_{12}^2 + 2.R_{11}.R_{22}.RL + 2.R_{11}.X_{22}.XL\end{array}}$$

Figure 4:
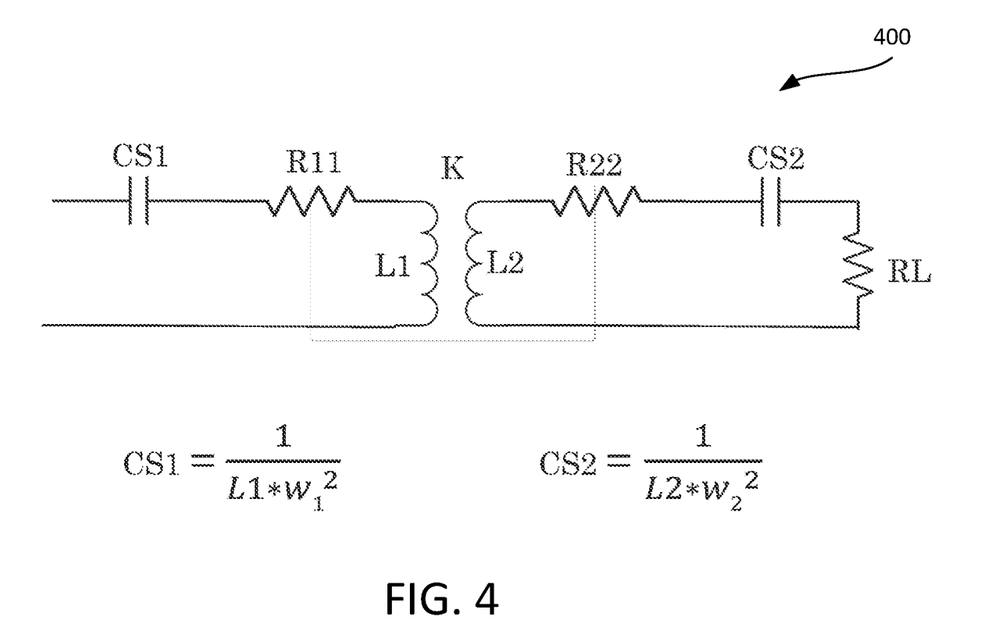
FIG. 4 is a schematic model 400 for wireless power transfer.

The wireless power transfer between two ports as shown in FIG. 2 can be simplified by a schematic representation 400 shown in FIG. 4 in conjunction with FIG. 3. The schematic representation 400 is known as "transformer+series capacitance" model. The optimum w (angular frequency) that supports the maximum efficiency in this model can be obtained as follows. Note that w=2πf (angular frequency=2. π.frequency).

$$w\_opt\_OR12 = \begin{pmatrix} \text{root } (\alpha 1, Z, 1) \\ \text{root } (\alpha 1, Z, 2) \\ \text{root } (\alpha 1, Z, 3) \end{pmatrix}$$

Where $$\alpha_1 = L_2XLZ^3 + 2R_{22}RLZ^2 - 2L_2^2w_2^2Z^2 + XL^2Z^2 + RL^2Z^2 + R_{22}^2Z^2 - 3L_2XLw_2^2Z + 2L_2^2w_2^4$$

Root $(\alpha_1, Z, K)$: represent roots of a polynomial;
$\alpha_1$: the polynomial;
Z: variable Z;
K: the Kth root of the polynomial;

$$z1 = -\frac{2R_{22}RL + \sigma_1 + \frac{\sigma_2^2 + 9L_2^2XL^2w_2^2}{\sigma_1} + R_{22}^2 + RL^2 + XL^2 - \sigma_3}{3L_2XL}$$

Where $$\sigma_1 = \left( \frac{\sqrt{\begin{array}{c}27L_2^2XL^2(108\ L_2^6XL^2w_2^8 - 108L_2^4XL^4w_2^6 + \\ 8L_2^2w_2^4\sigma_2^2 - 9L_2^2XL^2w_2^4\sigma_2^2 + 108L_2^4XL^2w_2^6\sigma_2)\end{array}}}{2} + \sigma_2^3 + 27L_2^4XL^2w_2^4 + \frac{27L_2^2XL^2w_2^2\sigma_2}{2} \right)^{1/3}$$

$$\sigma_2 = -\sigma_3 + R_{22}^2 + 2R_{22}RL + RL^2 + XL^2$$

$$\sigma_3 = 2L_2^2w_2^2$$

-continued $$z_2 = -\frac{2R_{22}RL + \sigma_1 + R_{22}^2 + RL^2 + XL^2 - \sigma_3 + \frac{\sigma_2^2 + 9L_2^2 XL^2 w_2^2}{\sigma_1}}{3L_2 XL}$$

$$\sigma_1 = \left(-\frac{1}{2} + \frac{\sqrt{3}\,i}{2}\right) \cdot \left(\frac{\sqrt{27L_2^2 XL^2(108\,L_2^6 XL^2 w_2^8 - 108L_2^4 XL^4 w_2^6 + 8L_2^2 w_2^4 \sigma_2^3 - 9L_2^2 XL^2 w_2^4 \sigma_2^2 + 108L_2^4 XL^2 w_2^6 \sigma_2)}}{2} + \right.$$

$$\left. \sigma_2^3 + 27L_2^4 XL^2 w_2^4 + \frac{27L_2^2 XL^2 w_2^2 \sigma_2}{2}\right)^{1/3}$$

$$\sigma_2 = -\sigma_3 + R_{22}^2 + 2R_{22}RL + RL^2 + XL^2$$

$$\sigma_3 = 2L_2^2 w_2^2$$

$$z_3 = -\frac{2R_{22}RL - \sigma_1 + R_{22}^2 + RL^2 + XL^2 - \sigma_3 - \frac{\sigma_2^2 + 9L_2^2 XL^2 w_2^2}{\sigma_1}}{3L_2 XL}$$

where $$\sigma_1 = \left(-\frac{1}{2} + \frac{\sqrt{3}\,i}{2}\right) \cdot \left(\frac{\sqrt{27L_2^2 XL^2(108\,L_2^6 XL^2 w_2^8 - 108L_2^4 XL^4 w_2^6 + 8L_2^2 w_2^4 \sigma_2^3 - 9L_2^2 XL^2 w_2^4 \sigma_2^2 + 108L_2^4 XL^2 w_2^6 \sigma_2)}}{2} + \right.$$

$$\left. \sigma_2^3 + 27L_2^4 XL^2 w_2^4 + \frac{27L_2^2 XL^2 w_2^2 \sigma_2}{2}\right)^{1/3}$$

$$\sigma_2 = -\sigma_3 + R_{22}^2 + 2R_{22}RL + RL^2 + XL^2$$

$$\sigma_3 = 2L_2^2 w_2^2$$

With XL=0, the optimum w can be shown as below:

$$w\_opt\_0XL\_0R12 = \frac{\sqrt{2}\,L_2 w_2^2}{\sqrt{2L_2^2 w_2^2 - R_{22}^2 - 2R_{22}RL - RL^2}} \quad \text{[Equation 2]}$$

And the corresponding efficiency is:

$$\text{EffX\_max\_wopt\_0R12} = -\frac{(4 \cdot L_1 \cdot L_2^3 \cdot RL \cdot k^2 \cdot w_2^4)}{(R_{22} + RL) \cdot (-4 \cdot L_1 \cdot L_2^3 \cdot k^2 \cdot w_2^4 - 4 \cdot R_{11} \cdot L_2^2 \cdot R_{22} \cdot w_2^2 - 4 \cdot R_{11} \cdot L_2^2 \cdot RL \cdot w_2^2 + R_{11} \cdot R_{22}^3 + 3 \cdot R_{11} \cdot R_{22}^2 \cdot RL + 3 \cdot R_{11} \cdot R_{22} \cdot RL^2 + R_{11} \cdot RL^3)}$$

As it can be observed, the optimum w is independent of $w_1$ and the optimum w is larger than $w_2$. Therefore, one can use what's discovered above to identify optimum operating angular frequency w (for maximum system efficiency) for a wireless power system. The same derivation can be expanded to cover the case between 1 PTDU and multiple PRDU/RU. The system with the optimum w requires less tuning during manufacturing time since there is less constrain on resonant frequency of resonators and the system can continue to function if f1 and f2 shift because of variety of reasons.

Using the information disclosed above, the system can determine an optimal driving frequency and a corresponding driving voltage VPA for the power transfer. The system monitors the emission of electromagnetic waves and detects changes from the environment, such as impedance change. The system continuously adjust the driving frequency and the driving voltage VPA according to the changes detected and the data exchange between the PRDU and the PTDU.

Figure 5:
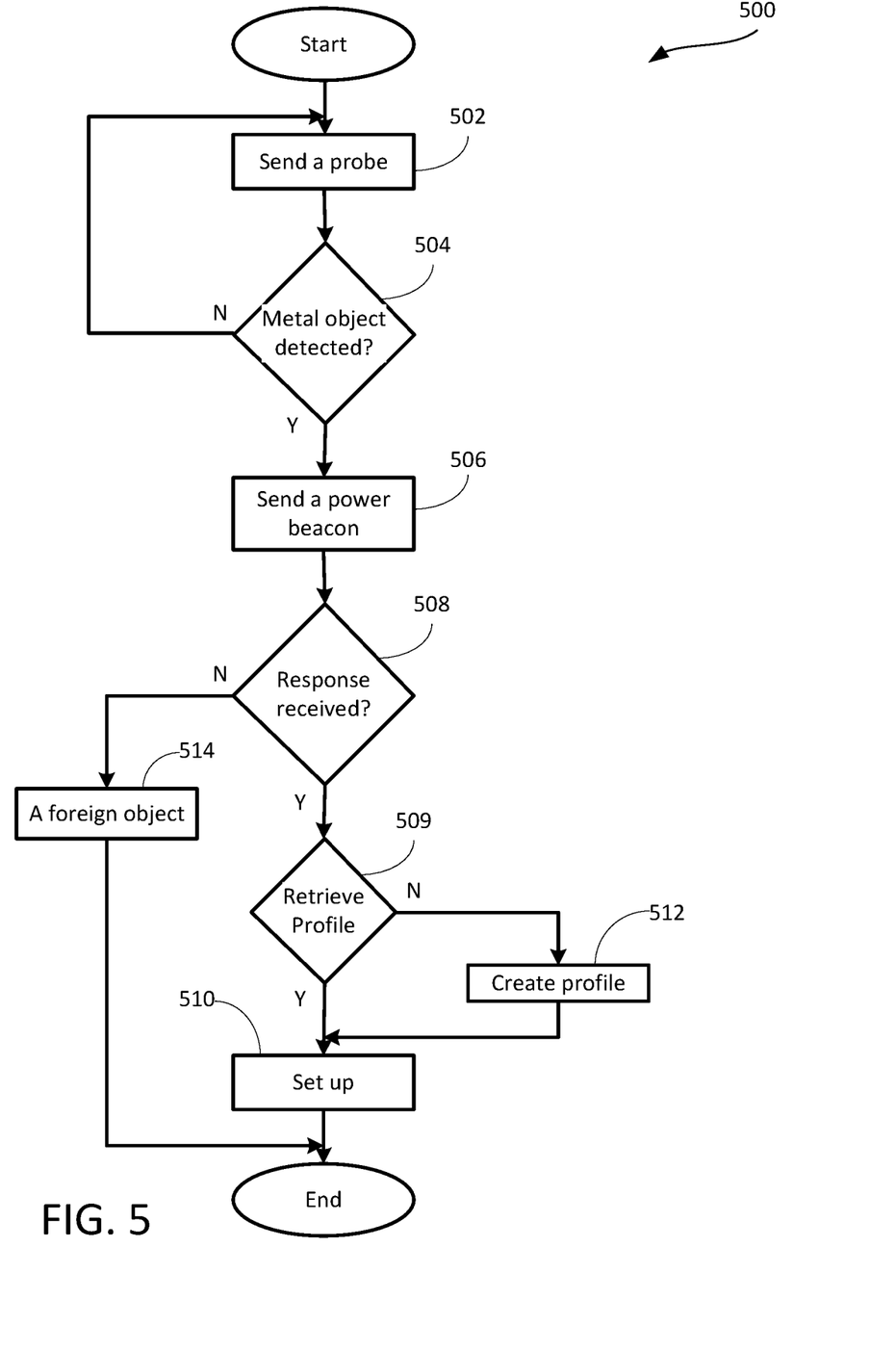
FIG. 5 is a flow chart 500 for identifying a foreign object.

FIG. 5 illustrates a process 500 for starting the power transfer. Before the power transfer begins, the PTDU 114 sends out a probe, step 502, if a potential PRDU is detected, step 504, the PTDU 114 sends a power beacon, step 506. The presence of a potential PRDU can be detected by checking the impedance detected by the PTDU 114. A suitable device, ready to receive electrical power, will respond to the power beacon, which will be received by the PTDU 114, step 508. The PTDU 114 retrieves and examines the profile, step 509. If the device is previously known, the PTDU 114 will set up the transfer parameters according to the device's profile, step 510; if the device is previously unknown, the PTDU 114 will create a profile for the device, step 512. If the PTDU 114 does not receive the expected response to the power beacon, the PTDU 114 will treat it as a foreign object, step 514.

In some special setting, it may be possible to have two PRDUs working with one single PTDU. The presence of another PRDU would reduce the energy received by each PRDU. The second PRDU will operate without the need for the PTDU to send another power beacon.

Figure 6:
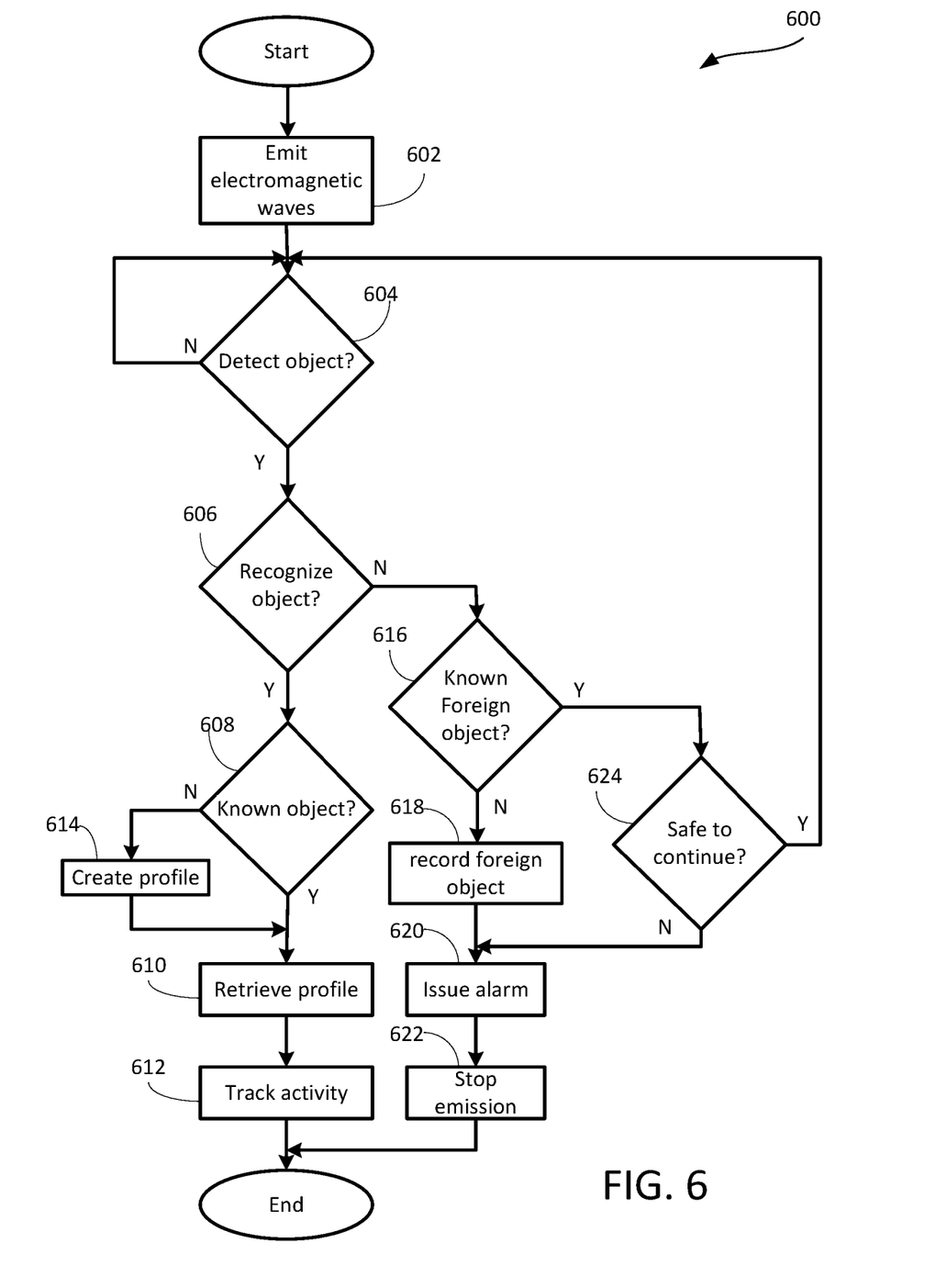
FIG. 6 is a flow chart 600 illustrating the interaction between a PTDU and a PRDU.

FIG. 6 illustrates an operating process 600 of a system according to one embodiment of the present invention. Previously described the initial emission of a power probe and a power beacon will not be repeated here. The PTDU 114 emits electromagnetic waves, step 602, and a PRDU 108 receives the electromagnetic waves and converts the electromagnetic waves into electricity for storage or for consumption. The PRDU 108 sends data back to the PTDU 114 and the data relates to the status of the power transfer. The data may indicate amount of the electricity received so far and this data is saved by the PTDU 114.

The PTDU 114 may detect a foreign object, step 604, by comparing the data received from the PRDU 108. When a foreign object is present near the power transfer setting, if the object is metallic, it may absorb part of the energy radiated by the electromagnetic waves, thus reducing the amount of the energy for the PRDU 108. The metallic foreign object may heat up by being exposed to the electromagnetic waves, thus creating a dangerous condition. The foreign object may also be detected when the PTDU detects change in impedance in emitting of electromagnetic waves or drop of signal strength in the signal from the communication channel to the PRDU. The foreign object may also be detected when the data received back from the PRDU 108 indicates that the pace of the electricity received by the PRDU 108 has decreased beyond a certain threshold. The threshold may be set according to the profile of the receiving PRDU.

If the PTDU 114 recognizes the object, step 606, the PTDU 114 retrieves the data received and compares with the profiles in a database, step 608. If the object is a known object, the profile is retrieved, step 610, and the PTDU 114 can adjust its setting according to the profile. The PTDU 114 tracks the wireless power transfer, step 612, by recording the data received from the object and updates the profile accordingly. If the object is not known previously, a profile will be created, step 614.

If the object is a foreign object, the PTDU 114 determines whether it is a known foreign object, step 616. A foreign object may be classified into different categories by checking if the strength of the communication signal, the impact on the impedance to emitting of electromagnetic waves over time, the impact on the impedance to emitting of electromagnetic waves over the frequency, and the impact on the efficiency over time. If it is a known object, the PTDU 114 will determine whether it is safe to continue the wireless power transfer, step 624. If it is not safe to continue, the PTDU 114 will issue an alarm, step 620, and the emission of electromagnetic waves will stop, step 622. If the foreign object is not known previously, the PTDU 114 will record the characteristics of the foreign object, step 618, and proceeds to issue the alarm and stops the emission of electromagnetic waves.

Figure 7:
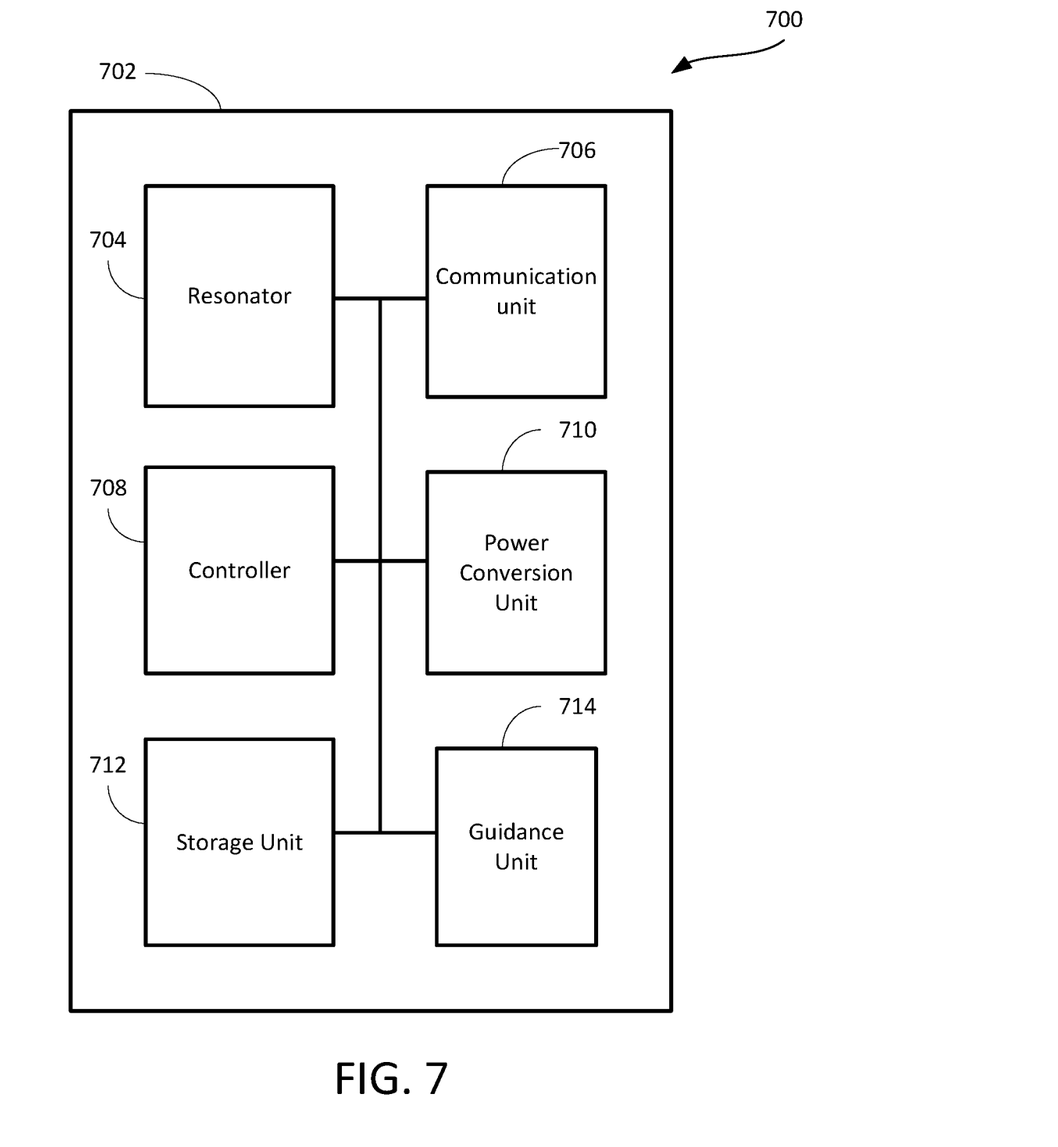
FIG. 7 is a diagram 700 for one embodiment of the PTDU.

FIG. 7 is a diagram 700 of a PTDU 702. A control function is installed in the storage unit 712 and executed by the controller 708. The controller 708 sets up the resonator 704 as the emitter of electromagnetic waves and the controller 708 may adjust the driving parameters for the resonator 708, thus affecting the characteristics of the electromagnetic waves. The power conversion unit 710 converts the electricity received from an external power source into electromagnetic waves and emitted by the resonator 704. The controller 708 also communicates with a server to retrieve the profiles according to the data received from the PRDU. The controller 708 uses the communication unit 706 to exchange the data with the PRDU. The PTDU also includes a guidance unit 714. The guidance unit 714 uses the environment information received by the PTDU during the operation to calculate and guide the PRDU to a best positioning relative to the PTDU. Conversely, the position of the PTDU can also be moved according to the information from the guidance unit 714. The PTDU is aware of the distance and orientation between the PTDU and PRDU based on the environment variables, such as impedance to emission of electromagnetic waves. The guidance unit 714 provides directional guidance through a visual display to a user. Alternatively, the directional guidance can also be issued through other means, such as audible guidance. The best position for the PRDU can be expressed as follows.

Position$(x,y)$=function$(Z, dS, \acute{\eta}, Q)$;

where Z is impedance from the environment, dS is change of signal strength, $\acute{\eta}$ is efficiency, and Q is quality factor.

The change in the relative position between the PRDU and the PRDU changes is reflected by change in all the parameters presented earlier, which includes impedance (Z), change of signal strength (dS), efficiency ($\acute{\eta}$), and quality factor (Q). The change in efficiency may be represented by a loss in the quality factor (Q value). The Q value represent non-dissipating energy/dissipating energy. If there is a loss in the system, the Q value for the system drops. In the context of the position adjust process, the different relative positions between the PTDU and the PRDU introduce different Q's. The different relative positions between the PTDU and the PRDU will also cause (1) change of the signal strength received by the other party, (2) change of efficiency because different power will be received by the PRDU, and (3) change of impedance sensed by the PTDU.

Figure 8:
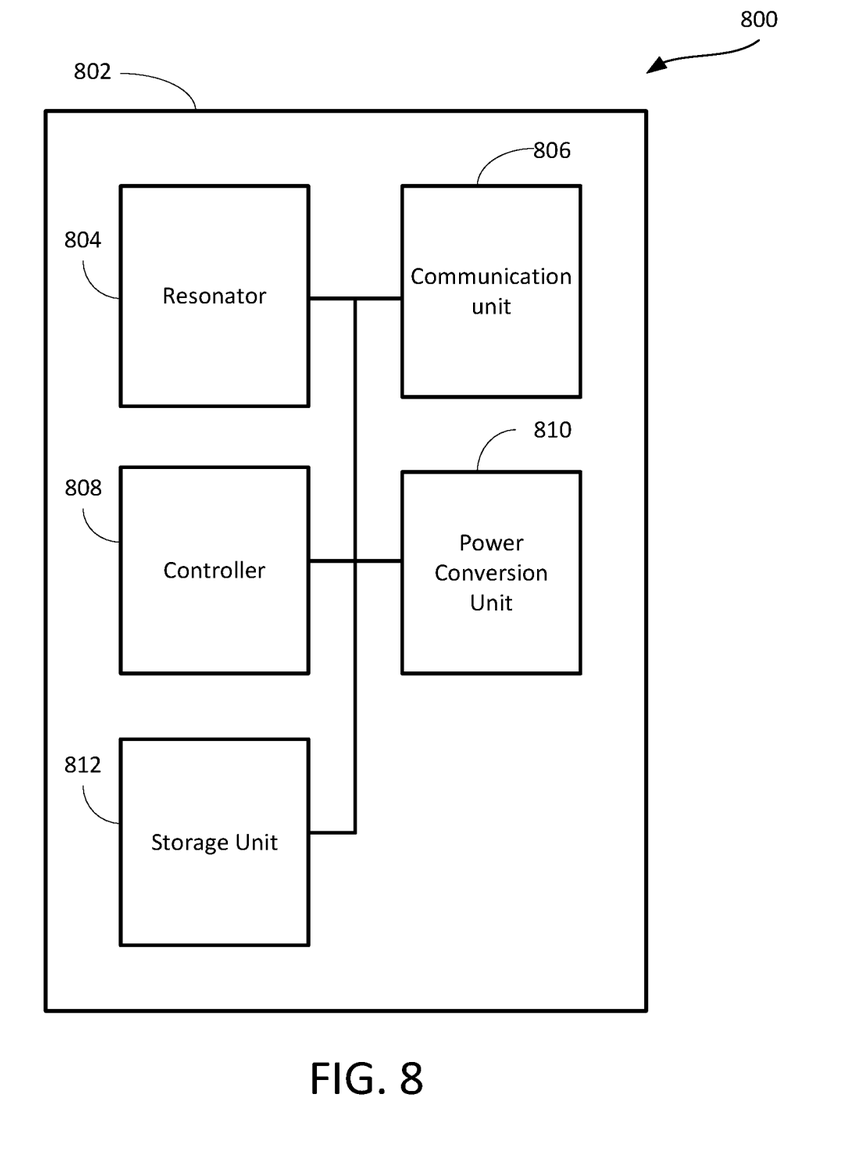
FIG. 8 is a diagram 800 for one embodiment of the PRDU.

FIG. 8 is a diagram 800 of a PRDU 802. A control function is installed in the storage unit 812 and executed by the controller 808. The controller 808 sets up the resonator 804 as the receiver of the electromagnetic waves. The controller 808 communicates with the PTDU. The controller 808 uses the communication unit 806 to exchange the data with the PTDU and also with the device 104. When the PRDU 802 receives the electromagnetic waves and the power conversion unit 810 converts the energy received through the electromagnetic waves to either AC or DC for consumption by a load.

Figure 9:
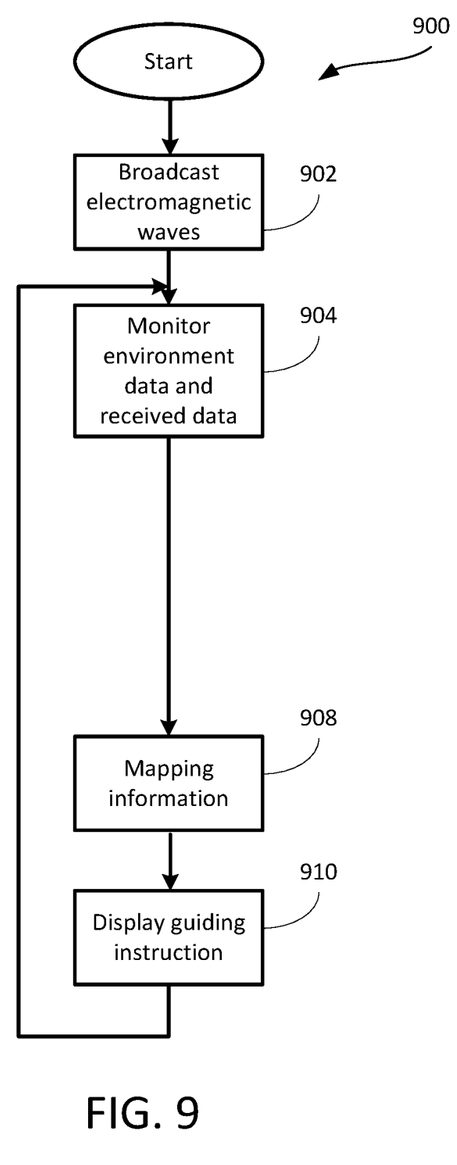
FIG. 9 is a flowchart 900 for initial positioning.

FIG. 9 is a flowchart 900 of the position adjustment process. While the PTDU emits electromagnetic waves, step 902, the PTDU monitors the environment data and the data received from the PRDU, step 904. The PRDU is placed initially around the PTDU and changes of signal strength, efficiency, impedance, and the Q value are recorded. A mapping information between relative positions and change of efficiency, signal strength, impedance, and Q value is obtained, step 908. Using this mapping information, the PTDU can provide directional guidance for proper physical alignment between the PTDU and the PRDU, step 910.

Figure 10:
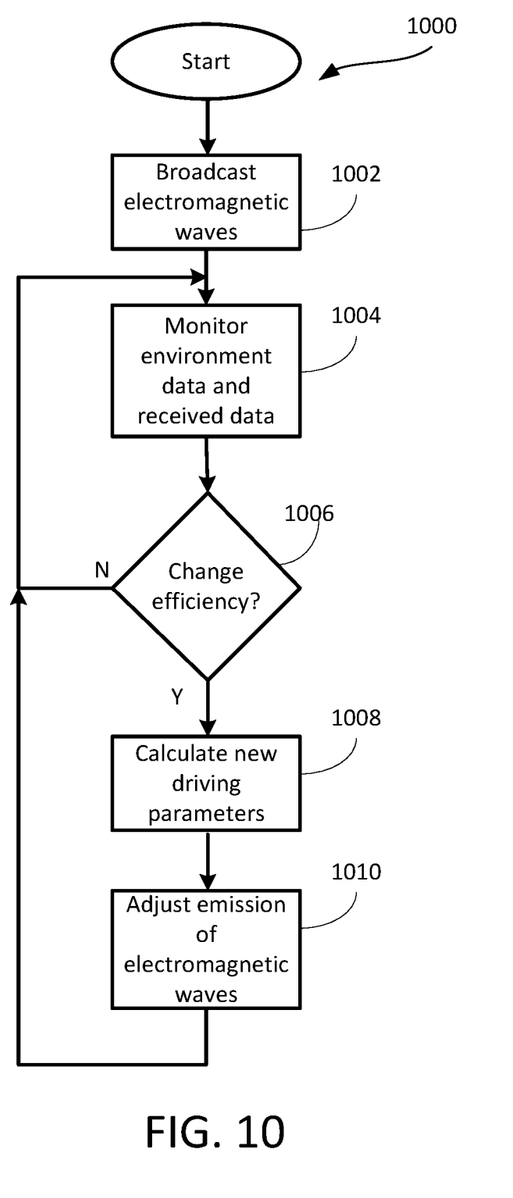
FIG. 10 is a flowchart 1000 for adjusting driving parameters of electromagnetic waves.

FIG. 10 is a flowchart 1000 continuous adjustment of driving parameters of electromagnetic waves. During a wireless power transfer, the PTDU emits electromagnetic waves, step 1002, and monitors the environment data and the data received from the PRDU, step 1004. If a change in efficiency is detected, step 1006, the PTDU recalculates the driving parameters, step 1008, and uses these recalculated driving parameters to adjust the emission of the electromagnetic waves, step 1010. The change in efficiency may be caused by many factors, such as introduction of foreign objects or changes in relative positioning of the PTDU and the PRDU among others.

When in use, the system of the present invention not only enables wireless charging of a mobile device but also provides electricity to a remote electric apparatus, such as a production machine in a factory. The production machine may be equipped with communication capabilities such as smart devices. Through use of a repeater unit, a PTDU can reach a PRDU located at a distant location in a factory setting. When the production machine is connected to the PRDU, the PTDU can detect the presence of the production machine and retrieve the profile for the production machine. The profile may indicate the duty cycle, the VPA, the frequency for the production machine, and past usage data among other information. If the PTDU learns from the profile that the production machine is generally operated in the afternoon and demands a X amount of power for a Y period of time, then the PTDU can adjust itself to emit electromagnetic waves during the afternoon for the Y period and for the X amount of power. The PTDU tailors its operation based on the profile for the production machine and the PTDU will update the profile with the data received from the PRDU and the production machine.

During the operation, the system continues to monitor the environment information from the PTDU and the information received from the PRDU and the load (smart device and/or production machine). If the system detects that the relative distance between the PTDU and the PRDU have changed, the system will adjust the parameters for driving the emitting of electromagnetic waves such as VPA and/or the driving frequency fs.

If a smart device equipped with a PRDU is placed adjacent to a PTDU for wireless powering purpose, the PTDU emits electromagnetic waves and also establishes a data link to the PRDU. While the smart device is being powered wirelessly by the PTDU, the user application on the smart device can communicate with servers on the Internet.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims. It is understood that features shown in different figures and described in different embodiments can be easily combined within the scope of the invention. It is also understood that the components of the system disclosed in this specification may be implemented through combination of software and hardware. The load described in the present specification may be a smart device or any other electrical apparatus.

Modifications, additions, or omissions may be made to the systems and methods described without departing from the scope of the disclosure. The components of the systems and methods described may be integrated or separated according to particular needs. Moreover, the operations of the systems and methods described may be performed by more, fewer, or other components without departing from the scope of the present disclosure.

Although the present disclosure has been described with several embodiments, sundry changes, substitutions, variations, alterations, and modifications can be suggested to one skilled in the art, and it is intended that the disclosure encompass all such changes, substitutions, variations, alterations, and modifications falling within the spirit and scope of the appended claims.

What is claimed is:

1. A system, for providing electrical power to a remote device through wireless transmission, comprising:
    a power transmitting data unit (PTDU) receiving electrical power from a power source; and
    at least one power receiving data unit (PRDU), connected to the remote device, receiving electromagnetic waves and converting the electromagnetic waves to the electrical power, the at least one PRDU having a second resonator,
    wherein
    the PTDU further comprises
    a controller,
    a first resonator emitting electromagnetic waves, and
    a DC/AC converter receiving electrical power from a power source and providing a driving voltage at a driving frequency to the first resonator,
    the driving frequency being independent from a resonant frequency of the first resonator and larger than a resonant frequency of the second resonator, and
    the controller monitors environment variables related to the emitting of electromagnetic waves and adjusts the driving frequency according to the environment variables.

2. The system of claim 1, wherein the controller calculates a best position for the at least one PRDU and issues instructions related to the best position according to the environment variables.

3. The system of claim 1, wherein the controller detects a change in relative position between the PTDU and the PRDU and the DC/AC converter provides a new set of the driving voltage and/or the driving frequency.

4. The system of claim 1, wherein the PTDU saves the information from the at least one PRDU into a profile associated with the remote device.

5. The system of claim 1, wherein the PTDU detects a foreign object based on the environment variables and database, stops emitting of electromagnetic waves after detection of the foreign object and if the foreign object is known the PTDU determines if it is safe to continue with emission of electromagnetic waves and if it is unsafe to continue, an alarm is issued.

6. The system of claim 1, wherein the PTDU retrieves a profile for the remote device and determines the driving voltage and the driving frequency according to the profile.

7. The system of claim 1, wherein the controller detects a change in load required from the remote device and the DC/AC converter provides a new set of the driving voltage and/or the driving frequency.

8. The system of claim 1 further comprising an artificial intelligent (AI) engine for detecting a foreign object by comparing information received from the remote device through the PRDU with a database, wherein if the foreign object is unknown the AI engine records characteristics of the foreign object in the database.

9. The system of claim 1, wherein the controller adjusts the driving voltage and/or the driving frequency provided by the DC/AC converter according to the environment variables, the driving frequency is obtained through determining an optimal angular frequency through $$w\_opt = \frac{\sqrt{2} \cdot L_2 \cdot w_2^2}{\sqrt{2 \cdot L_2^2 \cdot w_2^2 - R_{22}^2 - 2 \cdot R_{22} \cdot RL - RL^2}}$$

wherein:
w_opt is the optimum angular frequency,
$L_2$ is the inductance of the PRDU,
$w_2$ is the angular resonant frequency of the PRDU,
$R_{22}$ is the resistance of the port of the PRDU,
RL is the resistance of a load in the PRDU.

10. A method for transferring electrical power wirelessly to a remote device through electromagnetic waves, comprising:
emitting a power beacon by a power transmitting data unit (PTDU);
receiving, by the PTDU, an information from at least one power receiving data unit (PRDU);
retrieving, by the PTDU, a profile for the at least one PRDU based on the information received;
determining, by the PTDU, a driving voltage and a driving frequency according to environment variables; and
emitting, by the PTDU, electromagnetic waves according to the driving voltage and the driving frequency,
wherein
the driving frequency is independent from resonant frequency for the PTDU and larger than resonant frequency for the at least one PRDU.

11. The method of claim 10, further comprising:
detecting, by the PTDU, a foreign object based on the environment variables and database;
determining, by the PTDU, if it is safe to continue with emission of electromagnetic waves;
stopping, by the PTDU, the emission of the electromagnetic waves if it is unsafe to continue; and
issuing, by the PTDU, an alarm if it is unsafe to continue.

12. The method of claim 10, further comprising:
receiving, by the PTDU, data wirelessly from the PRDU; and
saving, by the PTDU, the data in the profile associated with the remote device.

13. The method of claim 12, further comprising adjusting the driving voltage and the driving frequency according to the data received and the environment variables.

14. The method of claim 10, further comprising:
determining a position information according to change in impedance; and
issuing the position information to a user.

15. The method of claim 10, further comprising storing the information from the at least one power receiving data unit in the profile.

16. The method of claim 10, further comprising:
detecting change in relative distance between the PTDU and the PRDU;
determining, by the PTDU, a new driving voltage and/or a new driving frequency according to the environment variables; and
emitting, by the PTDU, electromagnetic waves according to the new driving voltage and/or the new driving frequency.

17. The method of claim 10, further comprising:
receiving, by the PTDU, a user data from the remote device; and
sending, by the PTDU, the user data to a server connected to the Internet.

18. The method of claim 10, further comprising detecting the at least one PRDU by checking impedance from the PTDU.

19. The method of claim 10 further comprising
receiving, by an artificial intelligence (AI) engine, information from the remote device or the PTDU;
determining, by the AI engine, presence of a foreign object by comparing the information received from the PRDU or the PTDU with a database; and
recording, by the AI engine, characteristics of the foreign object in to the database if the foreign object is unknown.

20. The method of claim 10, wherein the driving frequency is obtained through determining an optimal angular frequency through $$w\_opt = \frac{\sqrt{2} \cdot L_2 \cdot w_2^2}{\sqrt{2 \cdot L_2^2 \cdot w_2^2 - R_{22}^2 - 2 \cdot R_{22} \cdot RL - RL^2}}$$

wherein:
w_opt is the optimum angular frequency,
$L_2$ is the inductance of the PRDU,
$w_2$ is the angular resonant frequency of the PRDU,
$R_{22}$ is the resistance of the port of the PRDU,
RL is the resistance of a load in the PRDU.

* * * * *